US010742670B1

United States Patent
Kayyoor et al.

(10) Patent No.: US 10,742,670 B1
(45) Date of Patent: Aug. 11, 2020

(54) DETECTING AND PREVENTING EXECUTION OF A MALICIOUS COMPUTER APPLICATION USING UTILITY DRIVEN GRAPH SUMMARIZATION

(71) Applicant: SYMANTEC CORPORATION, Mountain View, CA (US)

(72) Inventors: Ashwin Kumar Kayyoor, Santa Clara, CA (US); Petros Efstathopoulos, Los Angeles, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 289 days.

(21) Appl. No.: 15/956,608

(22) Filed: Apr. 18, 2018

(51) Int. Cl.
| | | |
|---|---|---|
| *H04L 29/06* | (2006.01) |
| *G06F 21/53* | (2013.01) |
| *H04L 12/733* | (2013.01) |
| *G06F 16/901* | (2019.01) |

(52) U.S. Cl.
CPC ...... *H04L 63/1416* (2013.01); *G06F 16/9024* (2019.01); *G06F 21/53* (2013.01); *H04L 45/122* (2013.01); *H04L 63/1425* (2013.01); *H04L 63/1441* (2013.01)

(58) Field of Classification Search
CPC ............. H04L 63/1425; H04L 63/1416; H04L 63/1433; H04L 63/1441; H04L 45/122; G06F 16/9024; G06F 21/53
USPC .......................................................... 726/23
See application file for complete search history.

(56) References Cited

U.S. PATENT DOCUMENTS

| | | | | |
|---|---|---|---|---|
| 8,181,251 | B2 * | 5/2012 | Kennedy | H04L 63/145 726/23 |
| 9,021,260 | B1 * | 4/2015 | Falk | G06F 21/56 713/165 |
| 9,256,739 | B1 * | 2/2016 | Roundy | G06F 21/554 |
| 9,749,347 | B2 * | 8/2017 | Pinney Wood | G06F 16/9024 |
| 10,164,995 | B1 * | 12/2018 | Fang | G06F 16/9024 |

(Continued)

OTHER PUBLICATIONS

Yang, Chao, et al. "Droidminer: Automated mining and characterization of fine-grained malicious behaviors in android applications." European symposium on research in computer security. Springer, Cham, 2014. (Year: 2014).*

(Continued)

*Primary Examiner* — Syed A Zaidi
(74) *Attorney, Agent, or Firm* — Maschoff Brennan (57) ABSTRACT

Utility driven graph summarization for use in detecting and preventing malicious computer application. In one embodiment, a method may include receiving a graph comprising a plurality of nodes and a plurality of edges, prioritizing each of the plurality of nodes by way of assigning a relative importance value to each node of the plurality of nodes, combining at least two nodes of the plurality of nodes into a supernode based at least on the relative importance value of each node, calculating a utility penalty value for creating a superedge between the supernode and a node neighboring the supernode, creating the superedge between the supernode and the node neighboring the supernode if the utility penalty value satisfies a pre-determined penalty threshold, calculating a utility level based at least in part on creating the supernode and the superedge, and repeating the method until the calculated utility level satisfies a pre-determined threshold.

20 Claims, 8 Drawing Sheets

(56) References Cited

U.S. PATENT DOCUMENTS

| | | | | |
|---|---|---|---|---|
| 2005/0097533 | A1* | 5/2005 | Chakrabarti | G06F 8/433 717/144 |
| 2009/0064332 | A1* | 3/2009 | Porras | H04L 63/101 726/23 |
| 2011/0066258 | A1* | 3/2011 | Torzhkov | G05B 13/042 700/29 |
| 2014/0123293 | A1* | 5/2014 | Tripp | G06F 21/577 726/25 |
| 2014/0372956 | A1* | 12/2014 | Bisca | G06F 16/93 715/848 |
| 2015/0242637 | A1* | 8/2015 | Tonn | G06F 21/577 726/25 |
| 2015/0287226 | A1* | 10/2015 | Chen | G06T 11/206 345/440 |
| 2017/0279822 | A1* | 9/2017 | Lord | G06N 5/04 |

OTHER PUBLICATIONS

Kolter, Jeremy Z., and Marcus A. Maloof. "Learning to detect malicious executables in the wild." Proceedings of the tenth ACM SIGKDD international conference on Knowledge discovery and data mining. 2004. (Year: 2004).*

Zhou, Wu, et al. "Fast, scalable detection of"Piggybacked" mobile applications." Proceedings of the third ACM conference on Data and application security and privacy. 2013. (Year: 2013).*

Cao, Yinzhi, et al. "EdgeMiner: Automatically Detecting Implicit Control Flow Transitions through the Android Framework." NDSS. 2015. (Year: 2015).*

NPL Search Results (Year: 2020).*

Brandes, U., and Fleischer, D.; "Centrality measures based on current flow"; In Proceedings of the 22Nd Annual Conference on Theoretical Aspects of Computer Science, Berlin, Heidelberg; 2005; pp. 533-544.

Cook, D. J., and Holder, L. B.; "Substructure discovery using minimum description length and background knowledge"; Journal of Artificial Intelligence Research 1; Feb. 1994; pp. 231-255.

Dunne, C., and Shneiderman, B.; "Motif simplification: Improving network visualization readability with fan, connector, and clique glyphs"; In Proceedings of the SIGCHI Conference on Human Factors in Computing Systems, New York, NY, USA; 2013; 14 pages.

Fan, B., Andersen, D. G., Kaminsky, M., and Mitzenmacher, M. D.; "Cuckoo filter: Practically better than bloom", In Proceedings of the 10th ACM International on Conference on Emerging Networking Experiments and Technologies, New York, NY, USA; 2014; 13 pages.

Fan, L., Cao, P., Almeida, J., and Broder, a. Z.; "Summary cache: A scalable wide-area web cache sharing protocol"; IEEE/ACM Transactions on Networking; vol. 8, Issue 3; Jun. 2000; pp. 281-293.

Jowhari, H., and Ghodsi, M.; "New streaming algorithms for counting triangles in graphs"; In Proceedings of the 11th Annual International Conference on Computing and Combinatorics, Berlin, Heidelberg; 2005; 7 pages.

Koutra, D. Kang, U. Vreeken, J., and Faloutsos, C.; "Summarizing and understanding large graphs"; Statistical Analysis and Data Mining; vol. 8, Issue 3; Jun. 2015; 21 pages.

Lefevre, K., and Terzi, E.; "GraSS: Graph structure summarization"; In SDM (2010); SIAM; pp. 454-465.

Leskovec, J., and Horvitz, E.; "Planetary-scale views on a large instant-messaging network"; In Proceedings of the 17th International Conference on World Wide Web, New York, NY, USA; 2008; 10 pages.

Li, C. Baciu, G., and Wang, Y.; "Modulgraph: Modularity-based visualization of massive graphs"; In SIGGRAPH, Asia; 2015; 4 pages.

Liu, X., Tian, Y., He, Q., Lee, W.-C., and Mcpherson, J.; "Distributed graph summarization"; In Proceedings of the 23rd ACM International Conference on Conference on Information and Knowledge Management, New York, NY, USA; 2014; 10 pages.

Liu, Y., Dighe, A., Safavi, T., and Koutra, D.; "Graph Summarization Methods and Applications: A Survey"; arXiv:1612.04883v3 [cs.IR]; Jan. 16 2018; 34 pages.

McGregor, A., Vorotnikova, S., and Vu, H. T.; "Better algorithms for counting triangles in data streams"; In Proceedings of the 35th ACM SIGMOD-SIGACT-SIGAI Symposium on Principles of Database Systems, New York, NY, USA; 2016; 11 pages.

Navlakha, S., Rastogi, R., and Shrivastava, N.; "Graph summarization with bounded error"; In Proceedings of the 2008 ACM SIGMOD International Conference on Management of Data, New York, NY, USA, 2008; 13 pages.

Shen, Z., Ma, K.-L, and Eliassi-Rad, T. Visual analysis of large heterogeneous social networks by semantic and structural abstraction. IEEE Transactions on Visualization and Computer Graphics 12, 6 (Nov. 2006), 13 pages.

* cited by examiner

DETECTING AND PREVENTING EXECUTION OF A MALICIOUS COMPUTER APPLICATION USING UTILITY DRIVEN GRAPH SUMMARIZATION

BACKGROUND

A network security application may monitor network devices on a network to attempt to detect whether any network device has been infected with a malicious application, such as a virus or a malware. Once a malicious application is detected, the network security application may prevent the network application from executing on the network device.

One method for detecting malicious applications employs the use of a relatively large security dataset organized into a base graph having vertices (also called nodes) connected by edges. Because of the relatively large security dataset, the corresponding base graph may also be relatively large. Therefore, to reduce the overall size of a base graph, in order to improve computational efficiency, the base graph may be perturbed. Perturbing a base graph may be accomplished by adding or deleting edges, collapsing nodes into supernodes, or collapsing edges into superedges.

Graph summarization is a specific graph perturbing technique where nodes are collapsed into supernodes and multiple edges are combined into superedges in order to form a more concise version of a larger, original graph.

Unfortunately, however, after a certain point graph summarization may affect the utility of a graph for a network security application because data is lost during graph summarization.

The subject matter claimed herein is not limited to embodiments that solve any disadvantages or that operate only in environments such as those described above; rather, this background is only provided to illustrate one example technology area where some embodiments described herein may be practiced.

SUMMARY

In one embodiment, a computer-implemented method for detecting and preventing execution of a malicious computer application using utility driven graph summarization may be performed, at least in part, by a computing system comprising one or more processors. The method may include (a) receiving a first graph comprising a plurality of nodes and a plurality of edges, the first graph used for detecting and preventing execution of the malicious computer application on the computing system, the first graph having a first utility level; (b) prioritizing each of the plurality of nodes by way of assigning a relative importance value to each node of the plurality of nodes; (c) combining at least two nodes of the plurality of nodes into a supernode based at least on the relative importance value of each node; (d) calculating a utility penalty value for creating a superedge between the superedge and a node neighboring the supernode; (e) creating the superedge between the supernode and the node neighboring the supernode if the utility penalty to connect the supernode with its potential neighbor satisfies a pre-determined threshold, for example, if the utility penalty to connect is less than the utility penalty to not connect them or vice versa; (f) calculating a second utility level based at least in part on creating the supernode and the superedge; (g) repeating (a)-(f) until the calculated second utility level satisfies a pre-determined utility threshold resulting in a second graph; (h) in response to determining that the calculated second utility level satisfies the pre-determined utility threshold, employing the second graph to analyze a computer application and determine that the computer application is malicious; and (i) performing a security action on the malicious computer application to prevent the malicious computer action from executing in a computing environment.

In some embodiments, the first utility level may be equal to a user-specified composition ratio of the number of nodes and the number of edges.

In some embodiments, the method may further include executing a centrality algorithm on the plurality of nodes. In some embodiments, the method may further include determining, for each node of the plurality of nodes, a list of pairs of two-hop neighbors; calculating a sum of the relative importance value of each of the nodes in each of the pairs of two-hop neighbors; sorting each of the pairs of two-hop neighbors based at least in part on the sum of the relative importance values; and combining the nodes in the pair of two-hop neighbors having the lowest sum. In these embodiments, determining the list of pairs of two-hop neighbors may further include determining, for each node of the plurality of nodes, a list of neighboring nodes having an edge distance equal to two.

In some embodiments, when the method calculates the utility penalty value, the method may further include identifying at least one spurious edge in the first graph; assigning a benefit value to the at least one spurious edge; and adjusting the first utility level based at least in part on the benefit value. The method may further include identifying an absence of a previously present edge; assigning a benefit value to the previously present edge; and adjusting the first utility level based at least in part on the benefit value. The method may further include determining a benefit value that combining a first edge between the supernode and a neighboring node and a second edge between the supernode and the neighboring node satisfies the pre-determined penalty threshold.

In some embodiments, after creating the superedge, the method may include eliminating previous edges present between the nodes of the supernode and neighboring nodes. In some embodiments, assigning the relative importance value may further include executing a centrality algorithm on the plurality of nodes.

In some embodiments, the method may further include maintaining a record of utility calculations for each repetition of (a)-(f). Repeating (a)-(f) may further include repeating (a)-(f) iteratively until the calculated second utility level is equal to or greater than the pre-determined utility threshold.

In some embodiments, the method may further include determining that the utility penalty value is greater than the pre-determined utility threshold; and maintaining an original edge between at least one of the nodes of the pair of nodes of the supernode and a neighboring node without creating a superedge.

In some embodiments, prioritizing the nodes may further include assigning a weight value to each of the nodes of the plurality of nodes such that the sum of the weight values for all of the nodes is equal to one.

Also, in some embodiments, one or more non-transitory computer-readable media may include one or more computer-readable instructions that, when executed by one or more computing devices, cause the one or more computing devices to perform a method for detecting and preventing execution of a malicious computer application using utility driven graph summarization.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Graphs are used in a myriad of industries and in numerous ways to convey and share information with users. As both the amount of available data and the ability to analyze data continue to grow, the size and complexity of graphs continue to increase, with some graphs comprising millions or even billions of nodes and edges. As the volume of graph data increases, it becomes more difficult, and more impractical, to store, process, analyze, and visualize the data contained in the graphs, as well as visualize the graphs themselves. In order to make the graph data more manageable, summarization methods become more important. In general, graph summarization seeks to find an abridged representation of the original graph, with the summarized graph still maintaining patterns observed in the original data and preserving specific structural and analytical properties. In some embodiments, graph data may be used to detect the presence of malicious files present in a computer system and/or network, as well as aid in preventing further malicious files or removing files once detected.

In some cases, graph summarization may be used to control the amount of data shared with others, including third parties having varying degrees of access to confidential information, thus mitigating potential privacy issues. Because receiving parties may possess varying trust levels with regard to shared information, graph summarization can control how much data should be removed and/or hidden to maintain privacy without rendering the summarized graph information non-useful.

Additionally, graph summarization provides a benefit in reducing the overall size of the graph, resulting in smaller storage needs. Furthermore, in some embodiments, summarized graphs may be loaded directly into memory to improve performance. In other embodiments, since graph summarization preserves certain features of the original graph, many graph algorithms and queries may be efficiently executed on summarized graphs that may be difficult to run on larger graphs.

Some embodiments disclosed herein may enable utility driven graph summarization, which in turn may enable improved analysis of large, complex graphs. In graph summarization, a number of nodes are combined into fewer supernodes and multiple edges are combined into fewer superedges in order to form a more concise, summarized graph. Summarizing an original graph may result in a loss of utility, and thus using a threshold utility level as a determining parameter may result in a more useful graph application. For example, in one embodiment, graph summarization may be used to hide fine-grained relations and thus, multiple summaries (each potentially having varied conciseness) of the same underlying graph may be shared among parties having different trust levels or different access to confidential information. In another embodiment, utility driven graph summarization may enable more efficiency in graph algorithms by reducing the overall size of the underlying graph data. In still other embodiments, utility driven graph summarization may improve visualization of large graphs displayed on limited-size display devices.

Figure 1:
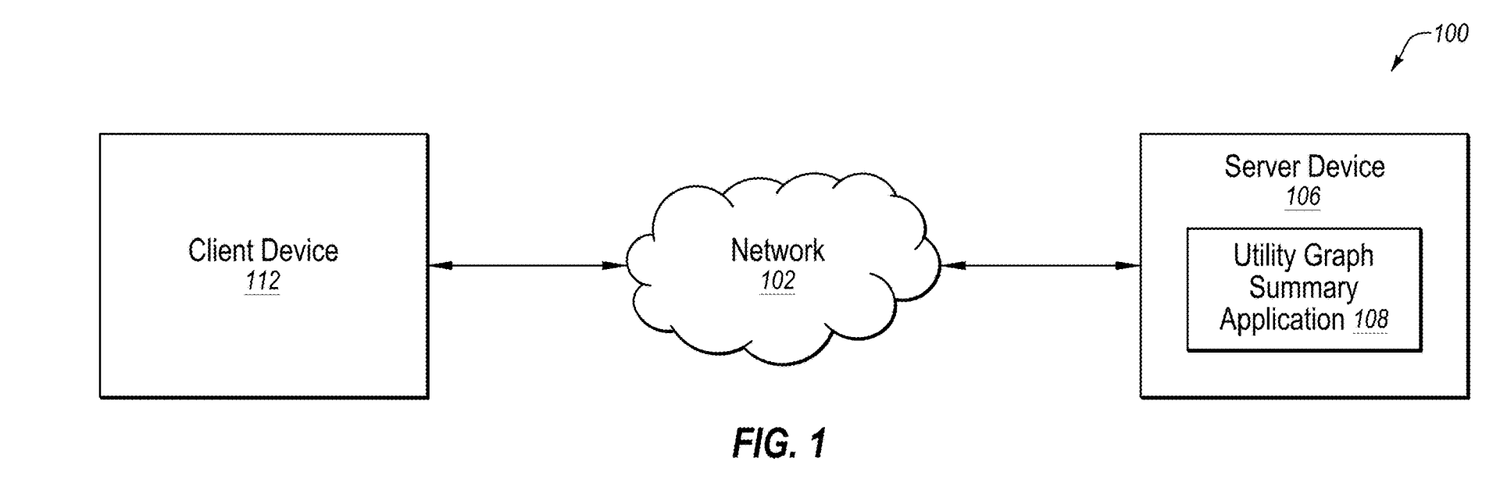
FIG. 1 illustrates an example system configured for detecting and preventing execution of a malicious computer application using utility driven graph summarization.

Turning to the figures, FIG. 1 illustrates an example system configured for detecting and preventing execution of a malicious computer application using utility driven graph summarization. The system 100 may include a network 102, a client device 104, and a server device 106. In some embodiments, the server device may further be configured to execute a utility graph summary application 108.

In some embodiments, the network 102 may be configured to communicatively couple the client device 104 and the server device 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
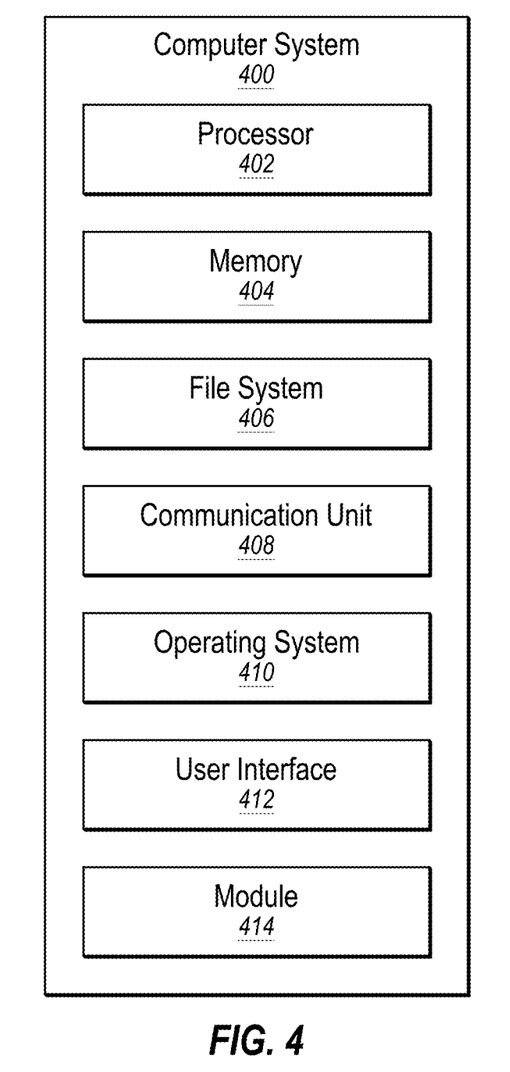
FIG. 4 illustrates an example computer system that may be employed in detecting and preventing execution of a malicious computer application using utility driven graph summarization.

In some embodiments, the client device 104 may be any computer system capable of communicating over the network 102 and capable of iterative graph summarization, examples of which are disclosed herein in connection with the computer system 400 of FIG. 4. Similarly, in some embodiments, the server device 106 may be any computer system capable of communicating over the network 102 and capable of iterative graph summarization, examples of which are disclosed herein in connection with the computer system 400 of FIG. 4.

In some embodiments, the utility graph summary application 108 may be implemented in conjunction with any application using graphs, and may include implementations associated with, but not limited to, products including Symantec's Elastica CloudSOC™ products, Symantec's DLP (Data Loss Prevention) products, and Symantec's LifeLock™ products, etc.

In some embodiments, the utility graph summary application 108 may be employed in iterative graph summarization. Graphs may be comprised of a number of nodes interconnected by a number of edges, each edge representing a relationship between two connected nodes. An original graph may contain 100% of the data intended to be represented by the nodes and edges contained in the graph; however, for various reasons, it may be desirable to provide varying levels of summarized content of the original graph to different parties. Thus, a pre-determined utility threshold may be selected, where the utility threshold is the minimum utility level a graph should maintain after summarization.

In some embodiments, graphs may be used to aid in the detection of and/or prevention of potentially malicious applications. In some embodiments, a malicious application may include one or more of a spyware, a virus, a worm, a logic bomb, a trapdoor, a Trojan horse, a Remote Admin Trojan (RAT), a malware, a mobile malicious code, a malicious font, and a rootkit. In order to aid in the detection and/or prevention of malware, it may be useful to obtain a graph of data showing a plurality of relationships; however, in some embodiments, a user interacting with the graph, or a recipient of the graph, may not have the processing and/or storage capacity to receive transmission of a large graph from a sender, store a large graph, and/or analyze a large graph. Summarizing an original graph to the pre-determined utility level may thus result in the receipt of a still-useful graph, but also a graph that is capable of being transmitted, stored, and/or analyzed by specific parties. In other embodiments, utility driven graph summarization may result in increased privacy, decreased size, improved speed of graph analysis algorithms, and/or improved visualization. In another embodiment, summarizing the graph to a pre-determined utility threshold may provide an economic advantage with regard to pricing; for example, a higher price correlates with a graph having higher utility, whereas a lower price correlates with a graph having lower utility.

In an embodiment where utility driven graph summarization is used to detect and/or prevent a malicious application (e.g., virus, malware), a security action may be performed upon detection of a malicious application. In some embodiments, the security action may be performed to prevent the malicious computer application from executing in a computing environment, including executing on an operating system of a network device. Performing the security action may include, for example, removing the malicious computer application from the computing environment, quarantining the malicious computer application in the computing environment, alerting an administrator to the malicious computer application, testing the malicious computer application in a safe environment, sending the malicious computer application to a separate computing environment for testing, or other contemplated security actions.

As disclosed herein, graph summarization may be approached on an iterative basis, where at each iteration relatively less important nodes and edges can be combined into supernodes and superedges, respectively, and the utility of the graph can be calculated at each iteration until the pre-determined utility threshold is satisfied. In some embodiments, the utility threshold may be alternatively selected as a user-specified granularity or compression level.

Iteratively summarizing a graph to satisfy a pre-determined utility threshold may be enabled by: first, prioritizing node pair candidates with respect to one another to determine which of any pairs of nodes should be combined into supernodes; second, iteratively applying an algorithm to the nodes to determine which of the node pairs should be collapsed to result in the desired utility; third, determining which, if any, of the original edges at each iteration should be combined to make superedges; and fourth, calculating an updated utility at each iteration to determine whether the pre-determined utility level is satisfied. Each of these actions may be performed by the utility graph summary application 108 of FIG. 1.

Prioritizing Node Candidates

The first action in each iterative summarization of any given graph G may be to prioritize node candidates. In determining which nodes and which edges of graph G will be collapsed into supernodes and superedges, the utility graph summary application 108 may execute an algorithm (e.g., a node current flow centrality algorithm, a betweenness centrality algorithm, etc.) to determine a relative importance level of each node compared to each other node and each edge compared to each other edge; for example, a node betweenness centrality algorithm may be executed to determine the relative importance of each of the nodes, and an edge betweenness centrality algorithm may be executed to determine the relative importance of each of the edges.

In some embodiments, executing a centrality algorithm may result in normalized scores for each of the nodes and each of the edges, such that the sum of normalized scores for each of the nodes is equivalent to one and the sum of normalized scores for each of the edges is equal to one. Although a centrality algorithm is discussed, any other contemplated algorithm used to determine the relative importance between nodes and between edges may be used. For example, in another embodiment, any algorithm which measures the centrality of a graph based on shortest paths such that, for every pair of nodes in a connected graph, the sum of the weights of the edges is minimized may alternatively be used.

Once the nodes and edges have been normalized and prioritized, the utility graph summary application 108 may extract pairs of all two-hop neighboring nodes and sort each of the pairs into a list of ascending order of each pairs' sum of centrality values (H). A two-hop neighbor may be defined as a length of two edges between a first node u and a second node v (e.g., with a third node w disposed between nodes u and v). The pair of nodes (u, v) residing at the top of the ascending list may have a higher priority for merging into supernodes than the nodes residing further down the list. In other words, the pair of nodes residing at the top of the list may have a lower importance level relative to the overall utility of graph G.

Iterative Greedy Summarization

From the top of the above described list, the node pair (u, v) having the lowest importance score (i.e., the highest priority for collapsing into a supernode) may be selected by the utility graph summary application 108 using a greedy algorithm. The greedy algorithm may select the locally optimal choice at each iteration, with the goal of finding a global optimum over a number of iterations. The nodes u and v may then be combined into a supernode $S_w$. Because the graph has been altered, candidate neighbor nodes may then be calculated, taking into consideration the new supernode $S_w$, and as a result a decision may be made as to whether to connect the new supernode $S_w$ with any or each of the new candidate neighbor nodes $S_n$ with a superedge.

Superedge Connectivity Decision Making

Two nodes, whether they be supernodes or not, may be connected with a superedge if the utility graph summary application 108 determines that connecting two nodes with a superedge is more beneficial in terms of overall utility versus less beneficial to not create a superedge. The utility benefit of creating a superedge may be defined as the minimum amount of cost or penalty that needs to be paid in terms of lost utility when a certain action is performed (i.e., creating a superedge). If utility graph summary application 108 determines that superedge connectivity is deemed beneficial between supernode $S_w$ and supernode (or node) $S_n$, then $S_w$ and $S_n$ may be connected through a new superedge, and all previous edges between the nodes that now constitute supernode $S_w$ (i.e., nodes u and v) and $S_n$ may be removed.

Incremental Utility Calculation

At each iteration of creating supernodes and superedges, the utility graph summary application 108 may keep track of each action and each related cost calculation performed in order to avoid redundant penalization of utility for each iteration. For each finalized superedge connectivity decision, for each iteration, the utility may be re-calculated. Utility may be affected by the loss of node data and relationship data due to combining nodes and combining (or eliminating) edges. In one embodiment, the utility may be penalized for any spurious edges introduced or for missing edges between nodes.

Each of the four actions disclosed above may be repeated as an interval of summarization until the calculation of the graph utility satisfies the pre-determined utility threshold. In some embodiments, each iteration of graph summarization may increase the efficiency of the described algorithms, resulting in faster and more accurate summarization.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Also, the utility graph summary application 108 may execute on the client device 104, as opposed to the server device 106, or may execute on another device not illustrated in FIG. 1.

Figure 2A:
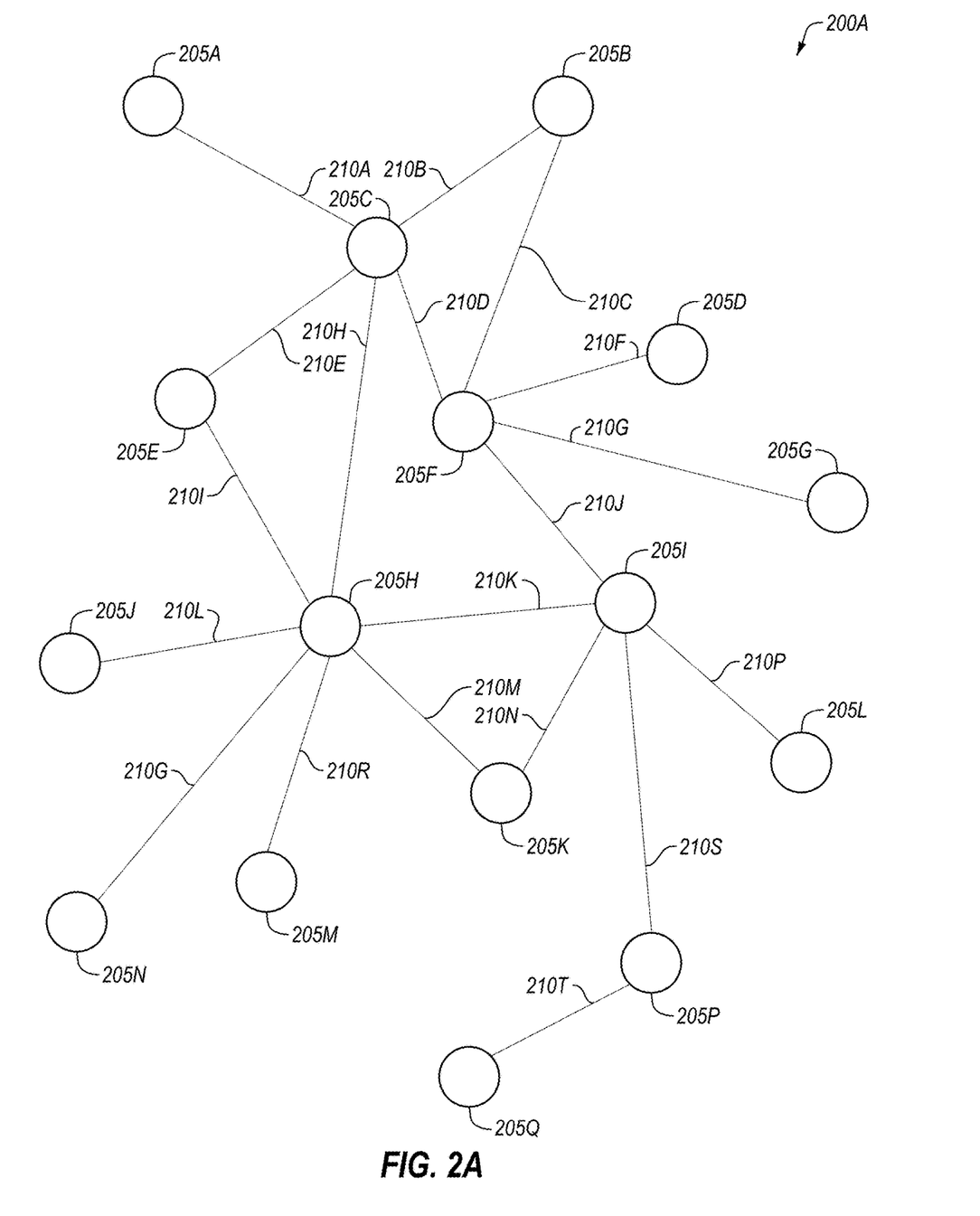
FIGS. 2A-2E illustrate various example stages of iterative graph summarization for utility driven graph summarization.

FIGS. 2A-2E illustrate various example stages of iterative graph summarization for utility driven graph summarization. FIG. 2A illustrates an example graph 200A (e.g., graph G) comprised of 16 nodes 205A-205Q interconnected by 18 edges 210A-210S. As disclosed herein, each node may be connected to another node by way of an edge. Each edge may represent the relationship between two nodes. In some embodiments, a node may represent file data and an edge between nodes may represent each node's safety reputation (e.g., probability of a file containing malware) in relationship to other connected nodes. In other embodiments, the relationship between nodes and edges may be used to determine the co-occurrence of files on one or more computers in order to determine a threat such as a Trojan downloader. In yet other embodiments, files may be connected with edges to represent the similarity between files, and thus determine the probability that at least one of the files is malicious and/or benign.

In one embodiment, graph 200A may be the original graph that contains all of the information and data meant to be represented by the non-summarized graph, and thus may be considered to have 100% utility. For example, in graph 200A, each node may represent a file on a computer operating in computing system 100 and each edge may represent the similarity between files present on a plurality of computers. A user may wish to determine the probability of any of the files being a malicious file; however, the number of files may be too large to process efficiently. Thus, while graph 200A represents 100% utility, the graph recipient (e.g., an analyst, a third-party, an administrator, etc.), may not want 100% utility or may not have the capacity to receive, store, and/or analyze graph 200A having 100% utility. In other previously discussed embodiments, visualization of graph 200A at 100% utility may be difficult, various parties may have different trust levels or allowed access to some of the data presented in graph 200A, other parties may have purchased only some, but not all, of the data presented in graph 200A, and thus a graph having, for example, only 87% utility may be desired, where 87% is still a sufficient utility value to determine the presence of malicious files. The resulting utility may thus ensure that 87% of the most important edges from the original graph are retained in the summarized graph. In another embodiment, the desired utility may not be an overall percentage, but may instead be a pre-determined composition ratio of x number of nodes and y number of edges from the original graph.

Turning again to FIG. 2A, the utility graph summary application 108 may execute a centrality algorithm on nodes 205A through 205Q, which results in each of the sixteen (16) nodes 205A through 205Q being assigned an importance score relative to each of the other nodes 205A through 205Q. In some embodiments, the importance scores of each node may be weighted or normalized, such that if the importance scores of the nodes are summed, the sum would be equal to one. Next, utility graph summary application 108 may extract a list of pairs of all 2-hop neighboring nodes and sort the pairs in ascending order relative to the pairs' sum of centrality values.

As an example, the centrality algorithm may determine that node 205J has the lowest importance score of the 16 nodes. The 2-hop neighbor nodes of 205J are determined to be nodes 205E, node 205C, node 205I, node 205K, node 205M, and node 205N. Thus, the 2-hop node pairs may be (J, N), (J, M); (J, K); (J, I); (J, C); and (J, E). The node pairs may be sorted into ascending order of their sum of centrality values, with node pair (J, N) having the lowest importance score and the highest priority for collapsing into a supernode, and node pair (J, E) having the highest importance score and the lowest priority for collapsing into a supernode. Thus, the utility graph summary application 108 may determine that in order to have the lowest iterative drop in utility, nodes 205J and 205N should be combined into a supernode.

Figure 2B:
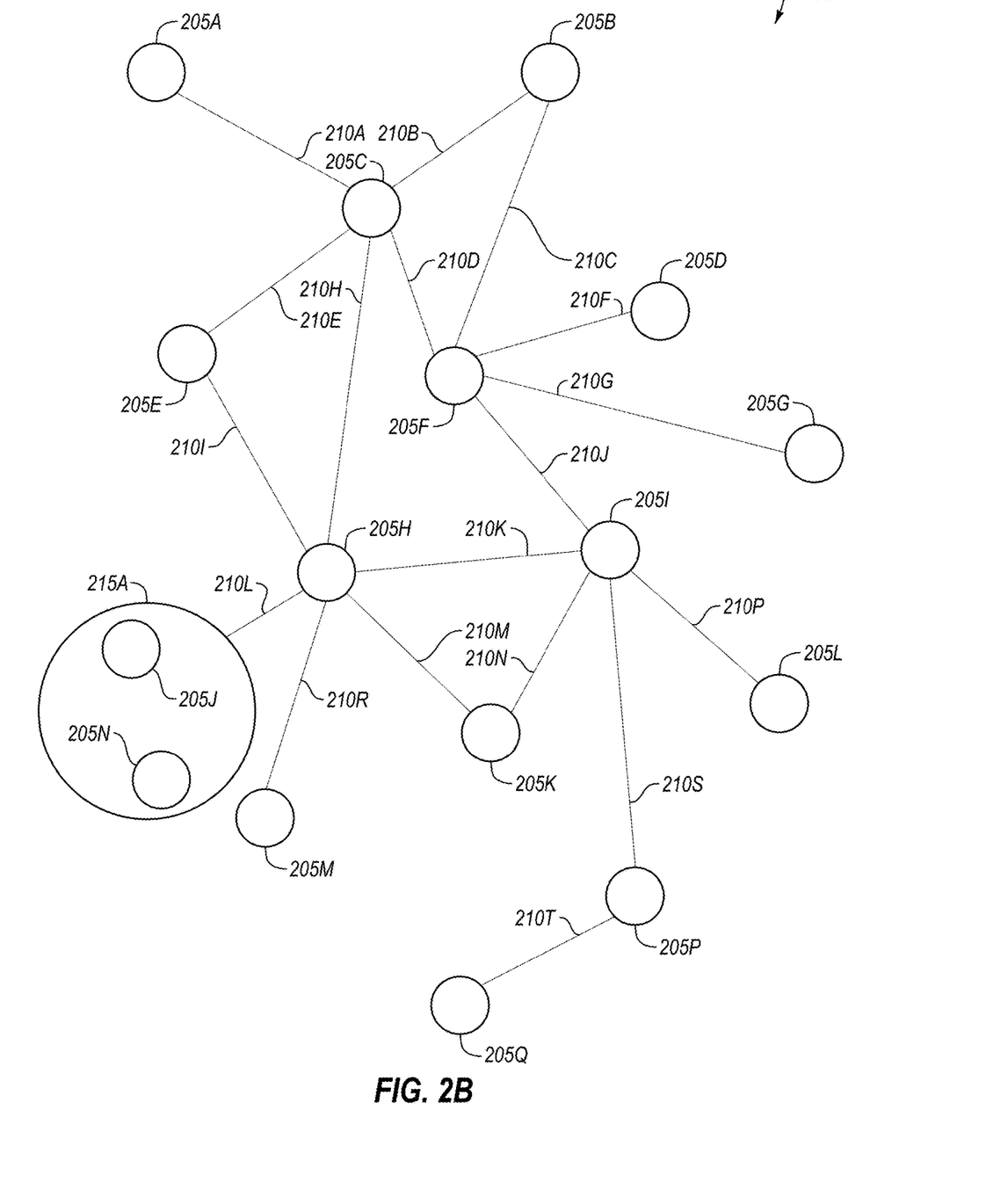

FIG. 2B illustrates an example graph 200B after one iteration of graph summarization on graph 200A. Based on the prioritization of node candidates and the application of the greedy algorithm, nodes 205J and 205N are collapsed into supernode 215A. Candidate neighbor nodes now include nodes 205E, 205H, and 205M. Before the creation of supernode 215A, node 205J was connected to node 205H by edge 210L, and node 205N was connected to node 205H by edge 210Q; thus, at this stage, the utility graph summary application may determine what to do with original edges 210L and 210Q. In other words, the application may decide whether connecting supernode 215A with a superedge is more beneficial in terms of utility as opposed to not creating a superedge. In the example of graph 200B, the application may determine there is no penalty, and thus edges 210L and 210Q may be collapsed into new superedge 220A.

Next, the updated utility of the graph may be calculated. Based on the creation of supernode 215A and superedge 220A, if an entity wanted to reconstruct the original graph 200A, then opening or accessing supernode 215A would automatically connect both original node 205J and 205N to neighbor node 205H; thus, there is no utility lost. Because it was determined that there was no penalty of utility to combine edges 210L and 210Q into superedge 220A, the utility level of graph 200B remains 100% and another iteration may be performed to bring the utility threshold closer to the desired 87%.

Still considering FIG. 2B, a second iteration may be performed. Utility graph summary application 108 may execute a centrality algorithm on nodes 205A-205I, 205K-205M, supernode 215A, and nodes 205P-205Q in order to assign an importance score to each of the nodes relative to each of the other nodes, with supernode 215A now considered as a node. Next, utility graph summary application 108 may extract a list of pairs of all 2-hop neighboring nodes and sort the pairs in ascending order relation to the pairs' sum of centrality values. As an example, the centrality algorithm may determine that supernode 215A has the lowest importance score for the remaining fifteen (15) nodes. The 2-hop neighbor nodes of supernode 215A are 205M, 205K, 205I, 205C and 205E. Thus, the 2-hop node pairs are (215A, 205M); (215A, 205K); (215A, 205I); (215A, 205C); and (215A, 205E). The node pairs may be sorted into ascending order of their sum of centrality values, with node pair (215A, 205M) determined to have the lowest importance score and the highest priority for collapsing into a supernode. Thus, the utility graph summary application 108 may combine nodes 215A and 205M into supernode 215B.

With the creation of supernode 215B, utility graph summary application 108 may next determine whether it is more beneficial to collapse superedge 220A and edge 210R into a superedge.

Figure 2C:
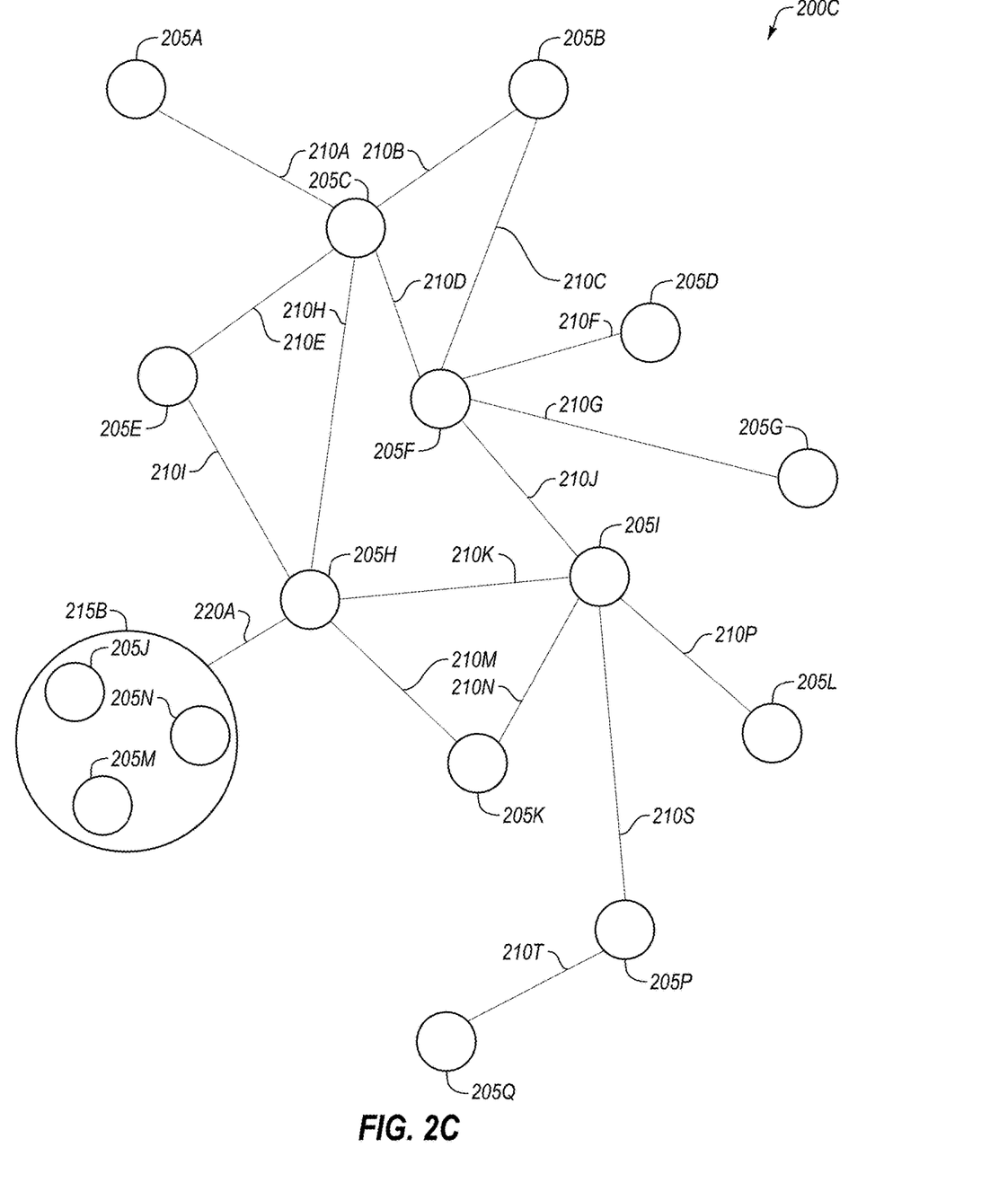

FIG. 2C illustrates an example graph 200C after a second iteration of graph summarization on original graph 200A (and a subsequent iteration of graph summarization on summarized graph 200B). FIG. 2C shows that, again, it was more beneficial to collapse superedge 220A and edge 210R into now-superedge 220A. As with the previous superedge creation with reference to FIG. 2B, there is no loss of utility calculated by creating supernode 215B and superedge 220A. Thus, the utility level remains 100% and another iteration may be performed.

Figure 2D:
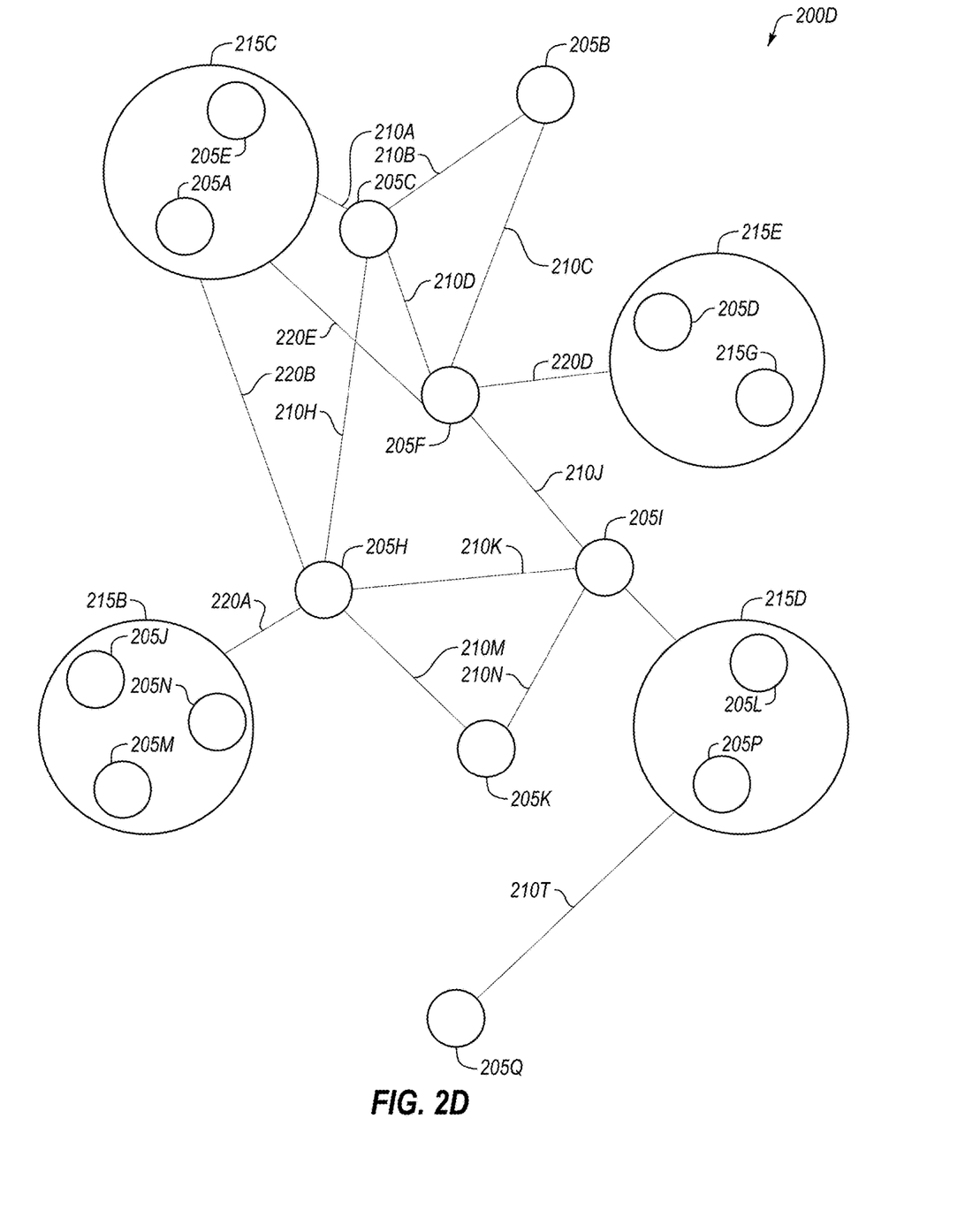

FIG. 2D shows the result of a third example iteration of graph summarization. For the sake of brevity and to avoid redundancy, FIG. 2D does not show the immediately subsequent summarization from FIG. 2C, but shows the result of a number of iterations resulting in a now-lower utility. As described previously, the remaining node pairs may be prioritized, 2-hop neighbors may be determined, node pairs may be sorted in ascending order of their importance values, and the determination to collapse pairs of nodes into supernodes may be made. Thus, FIG. 2D now illustrates four supernodes 215B, 215C, 215D, and 215E, as well as original nodes 205B, 205C, 205H, 205K, 205F, 205I, and 205Q. As also disclosed herein, superedge connectivity decision making is made and results in new superedges 220B, 220C, 220D, and 220E. In contrast to the previous iterations however, a decision was made not to combine edge 210A into a superedge; in other words, the cost of collapsing edge 210A into a superedge was higher than the benefit of maintaining its original edge status. As a result, the utility calculation at the end of this iteration is determined to be 92%; still higher than the desired 87%, and another iteration may be performed.

Figure 2E:
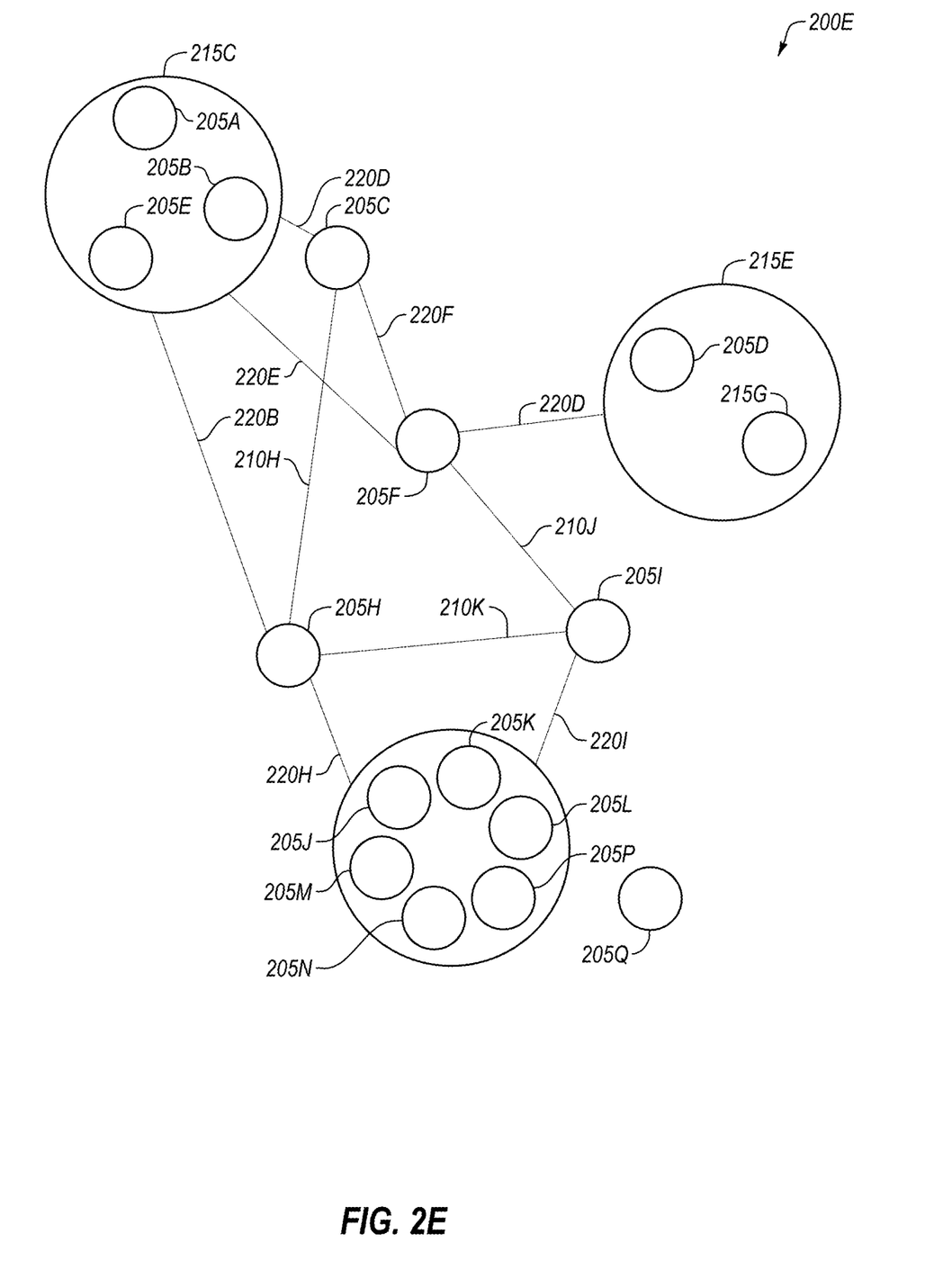

FIG. 2E shows the results of the final example of iterative graph summarization wherein the previous iterations have now resulted in satisfying the pre-determined utility threshold of 87%. In this final example, and using the methods described above, original nodes 205A, 205B, and 205E are combined into supernode 215B; original nodes 205D and 205G are combined into supernode 215D; and original nodes 205J, 205K, 205L, 205M, 205N, and 205P are combined into supernode 215E. Supernode 215 is connected by superedge 220B to original node 205H, superedge 220E to original node 205F, and now, with the addition of original node 205B to supernode 215, supernode 215 is connected to node 205C by superedge 220D. Superedge 220D is the combination of edges 210B and 210C. When node 205B combined into supernode 215B, edge 210C became part of 220E, resulting in a new edge between 205C and 205F-220F.

The combination of supernode 215A, 205K, and supernode 215C, resulted in edges 220A, 210M, 210N, and 220C becoming superedges 220H and 220I. The creation of supernode 215E severed the relationship between supernode 215C and node 205Q, resulting also in the deletion of edge 210T. These changes to the nodes and edges result in an example calculated utility of 87%, which satisfies the pre-determined utility threshold. Thus, the iterative graph summarization ceases.

In some embodiments, nodes and/or node pairs may share the same importance values. In such a situation, the utility graph summary application 108 may randomly select a node and/or node pair to collapse into a supernode.

Because each iteration of graph summarization reduces the utility by the least amount possible, a desired utility threshold may be reached while maintaining the structure and value of the original graph as much as possible. Each supernode and superedge creation may be determined based on the most beneficial decisions made at the lowest cost to utility.

Modifications, additions, or omissions may be made to the utility graph summary application 108 without departing from the scope of the present disclosure.

Figure 3:
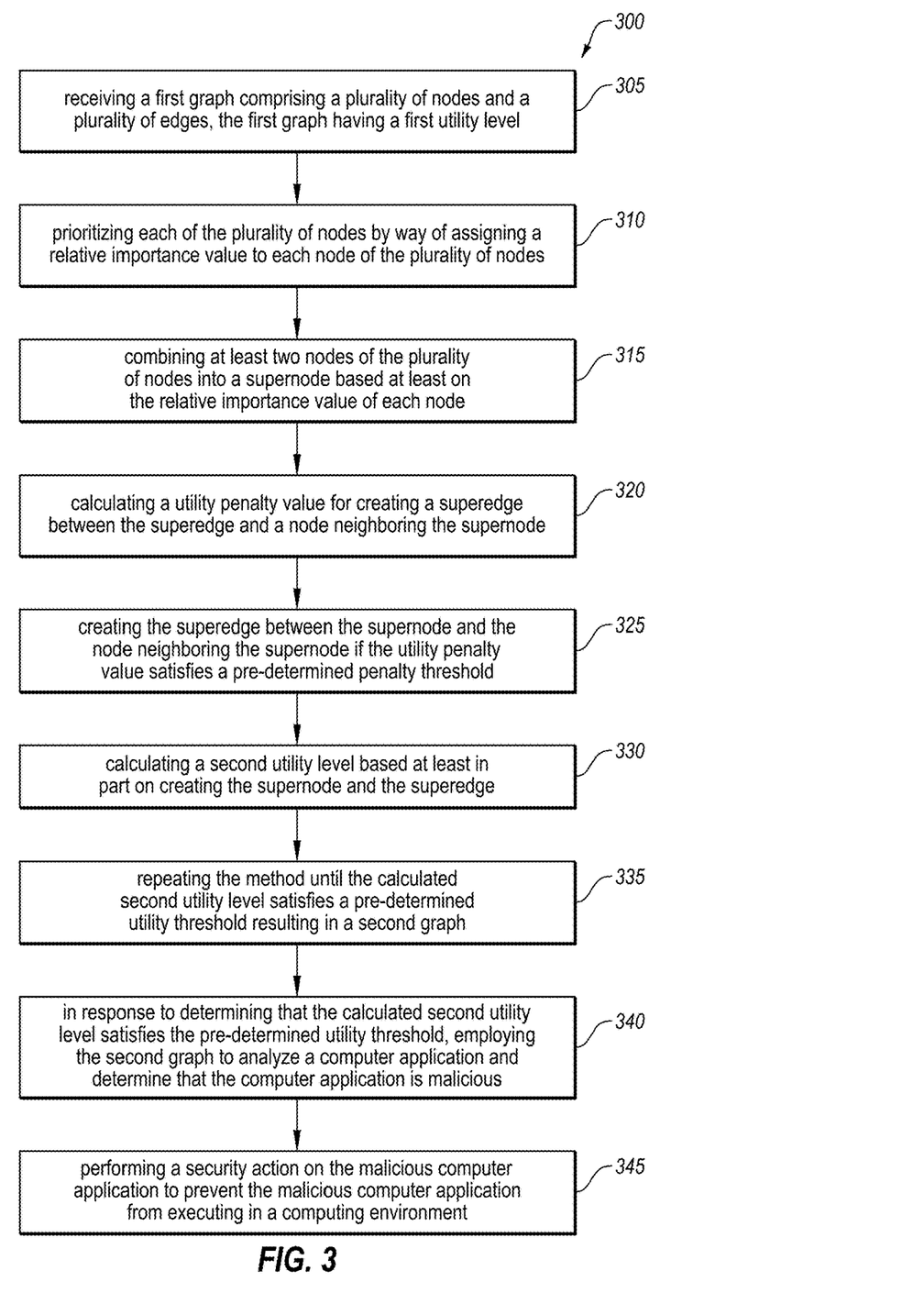
FIG. 3 illustrates a flowchart of an example method for detecting and preventing execution of a malicious computer application using utility driven graph summarization.

FIG. 3 is flowchart of an example method 300 for detecting and preventing execution of a malicious computer application using utility driven graph summarization. The method 300 may be performed, in some embodiments, by a device or system, such as by the client device 104 and/or the server device 106 and/or the utility graph summary application 108 executing one of these devices. In these and other embodiments, the method 300 may be performed by one or more processors based on one or more computer-readable instructions stored on one or more non-transitory computer-readable media. The method 300 will now be described in connection with FIGS. 1, 2A-2E, and 3.

The method 300 may include, at action 305, receiving a first graph comprising a plurality of nodes and a plurality of edges, the first graph having a first utility level, examples of which are disclosed in connection with FIGS. 1 and 2A-2E.

The method 300 may include, at action 310, prioritizing each of the plurality of nodes by way of assigning a relative importance value to each node of the plurality of nodes, examples of which are disclosed in connection with FIGS. 1 and 2A-2E.

The method 300 may include, at action 315, combining at least two nodes of the plurality of nodes into a supernode based at least on the relative importance value of each node, examples of which are disclosed in connection with FIGS. 1 and 2A-2E.

The method 300 may include, at action 320, calculating a utility penalty value for creating a superedge between the superedge and a node neighboring the supernode, examples of which are disclosed in connection with FIGS. 1 and 2A-2E.

The method 300 may include, at action 325, creating the superedge between the supernode and the node neighboring the supernode if the utility penalty value satisfies a pre-determined penalty threshold, examples of which are disclosed in connection with FIGS. 1 and 2A-2E.

The method 300 may include, at action 330, calculating a second utility level based at least in part on creating the supernode and the superedge, examples of which are disclosed in connection with FIGS. 1 and 2A-2E.

The method 300 may include, at action 335, repeating actions 305-330 until the calculated second utility level satisfies a pre-determined utility threshold, examples of which are disclosed in connection with FIGS. 1 and 2A-2E.

The method 300 may include, at action 340, in response to determining that the calculated second utility level satisfies the pre-determined utility threshold, employing the second graph to analyze a computer application and determine that the computer application is malicious, examples of which are disclosed in connection with FIGS. 1 and 2A-2E.

The method 300 may include, at action 345, performing a security action on the malicious computer application to prevent the malicious computer application from executing in a computing environment, examples of which are disclosed in connection with FIGS. 1 and 2A-2E.

The method 300 may thus be employed, in some embodiments, to summarize an original graph to the pre-determined utility level, resulting in the receipt of a still-useful graph, but also a graph that is capable of being transmitted, stored, and/or analyzed by specific parties. In other embodiments, the method 300 may result in increased privacy, decreased size, improved speed of graph analysis algorithms, and/or improved visualization. In another embodiment, the method 300 may provide an economic advantage with regard to pricing; for example, a higher price correlates with a graph having higher utility, whereas a lower price correlates with a graph having lower utility.

Although the actions of the method 300 are illustrated in FIG. 3 as discrete actions, various actions may be divided into additional actions, combined into fewer actions, reordered, expanded, or eliminated, depending on the desired implementation.

Further, it is understood that the method 300 may improve the functioning of a computer system itself. For example, the functioning of the utility graph summary application 108 on the client device 104 of the server device 106 may itself be improved by the method 300. For example, the utility graph summary application 108 may be improved by more efficiently and more accurately determining which nodes to combine into supernodes and edges to combine into superedges with each iteration, and then using the summarized graph to analyze a computer application and more efficiently and accurately determine whether the computer application is malicious than was possible with conventional methods.

Also, the method 300 may improve the technical field of utility drive graph summarization and malicious application detection by using utility as a parameter to summarize graph data. Thus, summarized graphs may maintain the same structure and analytical characteristics, while being pared down only to the utility level desired by a user, resulting in more efficient transmission, storage, visualization, economic value determinations, and improving privacy, as well as improved determinations of whether a computer application is malicious than was possible with conventional methods.

FIG. 4 illustrates an example computer system that may be employed in detecting and preventing execution of a malicious computer application using utility driven graph summarization. In some embodiments, the computer system 400 may be part of any of the systems or devices described in this disclosure. For example, the computer system 400 may be part of any of the client device 104 and the server device 106 of FIG. 1.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, in one or more applications, such as the utility graph summary application 108 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as the utility graph summary application 108 of FIG. 2

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, is described with reference to specific embodiments; however, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed, and various embodiments with various modifications as may be suited to the particular use contemplated.

The invention claimed is:

1. A computer-implemented method for detecting and preventing execution of a malicious computer application using utility driven graph summarization, at least a portion of the method being performed by a computing system comprising one or more processors, the method comprising:
 (a) receiving a first graph comprising a plurality of nodes and a plurality of edges, the first graph used for detecting and preventing execution of the malicious computer application on the computing system, the first graph having a first utility level;
 (b) prioritizing each of the plurality of nodes by way of assigning a relative importance value to each node of the plurality of nodes;
 (c) combining at least two nodes of the plurality of nodes into a supernode based at least on the relative importance value of each node;
 (d) calculating a utility penalty value for creating a superedge between the supernode and a node neighboring the supernode;
 (e) creating the superedge between the supernode and the node neighboring the supernode if the utility penalty value satisfies a pre-determined penalty threshold;
 (f) calculating a second utility level based at least in part on creating the supernode and the superedge;
 (g) repeating (a)-(f) until the calculated second utility level satisfies a pre-determined utility threshold resulting in a second graph;
 (h) in response to determining that the calculated second utility level satisfies the pre-determined utility threshold, employing the second graph to analyze a computer application and determine that the computer application is malicious; and
 (i) performing a security action on the malicious computer application to prevent the malicious computer application from executing in a computing environment.

2. The method of claim 1, wherein the assigning of the relative importance value to each node of the plurality of nodes at (b) further comprises:
 executing a centrality algorithm on the plurality of nodes.

3. The method of claim 1, wherein the combining of at least two nodes of the plurality of nodes at (c) further comprises:
 determining, for each node of the plurality of nodes, a list of pairs of two-hop neighbors;
 calculating a sum of the relative importance value of each of the nodes in each of the pairs of two-hop neighbors;
 sorting each of the pairs of two-hop neighbors based at least in part on the sum of the relative importance value; and
 combining the nodes in the pair of two-hop neighbors having a lowest sum.

4. The method of claim 3, wherein the determining of the list of pairs of two-hop neighbors further comprises:
 determining, for each node of the plurality of nodes, a list of neighboring nodes having an edge distance equal to two.

5. The method of claim 1 wherein the calculating of the utility penalty value at (d) further comprises:
 identifying at least one spurious edge in the first graph;
 assigning a benefit value to the at least one spurious edge; and
 adjusting the first utility level based at least in part on the benefit value.

6. The method of claim 1 wherein the calculating of the utility penalty value at (d) further comprises:
 identifying an absence of a previously present edge;
 assigning a benefit value to the previously present edge; and
 adjusting the first utility level based at least in part on the benefit value.

7. The method of claim 1, wherein the calculating of the utility penalty value at (d) further comprises:
 determining a benefit value that combining a first edge between the supernode and a neighboring node and a second edge between the supernode and the neighboring node satisfies the pre-determined penalty threshold.

8. The method of claim 1, further comprising:
 after creating the superedge at (e), eliminating previous edges present between the nodes of the supernode and neighboring nodes.

9. The method of claim 1, wherein the assigning of the relative importance value at (b) further comprises:
 executing a centrality algorithm on the plurality of nodes.

10. The method of claim 1, further comprising:
 maintaining a record of utility calculations for each repetition of (a)-(f).

11. The method of claim 1, wherein the repeating of (a)-(f) further comprises:
 repeating (a)-(f) iteratively until the calculated second utility level is equal to or greater than the pre-determined utility threshold.

12. The method of claim 1, further comprising:
 determining that the utility penalty value is greater than the pre-determined utility threshold; and
 maintaining an original edge between at least one of the nodes of the pair of nodes of the supernode and a neighboring node without creating a superedge.

13. The method of claim 1, wherein the prioritizing of the nodes at (b) further comprises:
 assigning a weight value to each of the nodes of the plurality of nodes such that the sum of the weight values for all of the nodes is equal to one.

14. The method of claim 1, wherein the first utility level is equal to a user-specified composition ratio of the number of nodes and the number of edges.

15. The method of claim 1, wherein performing the security action further comprises:
 at least one of removing the malicious computer application from the computing environment; quarantining the malicious computer application in the computing environment; alerting an administrator to the malicious computer application; testing the malicious computer application in a safe environment; sending the malicious computer application to a separate computing environment for testing or a combination herein.

16. One or more non-transitory computer-readable media comprising one or more computer-readable instructions that, when executed by one or more processors of a computing device, cause the computing device to perform a method for detecting and preventing execution of a malicious computer application using utility driven graph summarization, the method comprising:
 (a) receiving a first graph comprising a plurality of nodes and a plurality of edges, the first graph used for detecting and preventing execution of the malicious computer application on the computing system, the first graph having a first utility level;
 (b) prioritizing each of the plurality of nodes by way of assigning a relative importance value to each node of the plurality of nodes;

(c) combining at least two nodes of the plurality of nodes into a supernode based at least on the relative importance value of each node;

(d) calculating a utility penalty value for creating a superedge between the supernode and a node neighboring the supernode;

(e) creating the superedge between the supernode and the node neighboring the supernode if the utility penalty value satisfies a pre-determined penalty threshold;

(f) calculating a second utility level based at least in part on creating the supernode and the superedge; and (g) repeating (a)-(f) until the calculated second utility level satisfies a pre-determined utility threshold resulting in a second graph;

(h) in response to determining that the calculated second utility level satisfies the pre-determined utility threshold, employing the second graph to analyze a computer application and determine that the computer application is malicious; and (i) performing a security action on the malicious computer application to prevent the malicious computer application from executing in a computing environment.

17. The one or more non-transitory computer-readable media of claim 16, wherein the combining of at least two nodes of the plurality of nodes further at (c) comprises: determining, for each node of the plurality of nodes, a list of pairs of two-hop neighbors; calculating a sum of the relative importance value of each of the nodes in each of the pairs of two-hop neighbors; sorting each of the pairs of two-hop neighbors based at least in part of the sum of the relative importance value; and combining the nodes in the pair of two-hop neighbors having a lowest sum.

18. The one or more non-transitory computer-readable media of claim 16, wherein the assigning of the relative importance value to each node of the plurality of nodes at (b) further comprises:
executing a centrality algorithm on the plurality of nodes.

19. The one or more non-transitory computer-readable media of claim 16, wherein determining of the list of pairs of two-hop neighbors further comprises:
determining, for each node of the plurality of nodes, a list of all neighboring nodes having an edge distance equal to two.

20. The one or more non-transitory computer-readable media of claim 16, wherein the repeating of (a)-(f) further comprises:
repeating (a)-(f) iteratively until the calculated second utility level is equal to or greater than the pre-determined utility threshold.

* * * * *